J. B. SCHUMAN.
SHOCK LOADER AND UNLOADER.
APPLICATION FILED APR. 9, 1907.
983,774.
Patented Feb. 7, 1911.
2 SHEETS—SHEET 1.
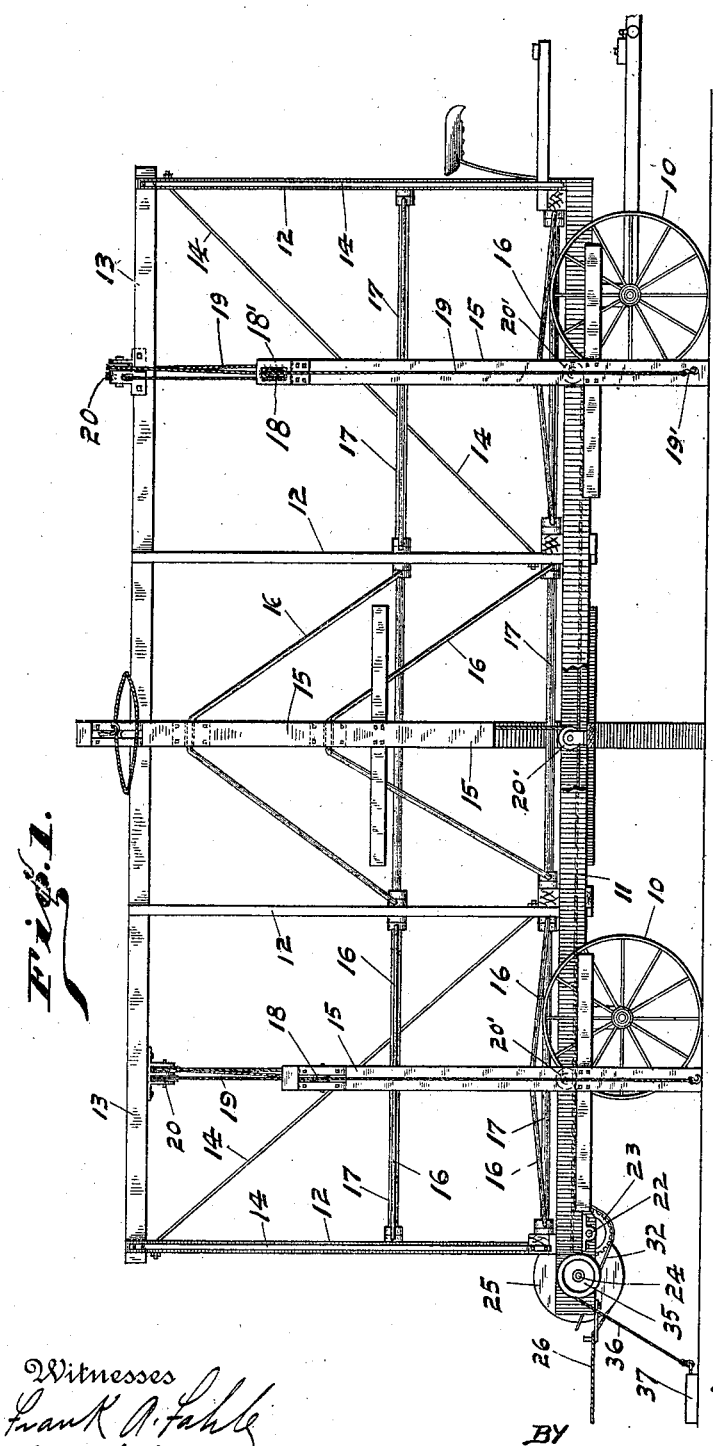
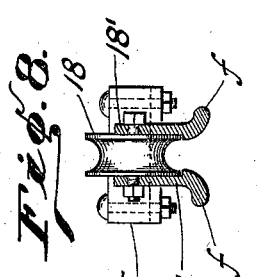
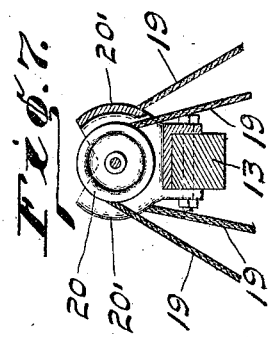
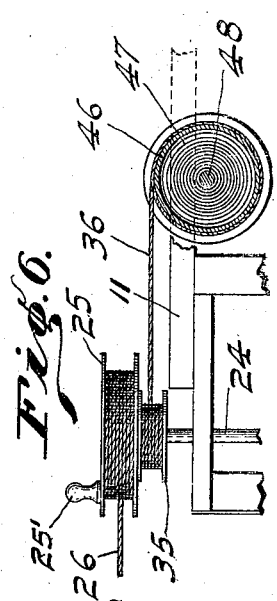
Witnesses
Frank A. Fahle
Thomas H. McMeans
Inventor
James B. Schuman
BY
Bradfords Hood
Attorneys

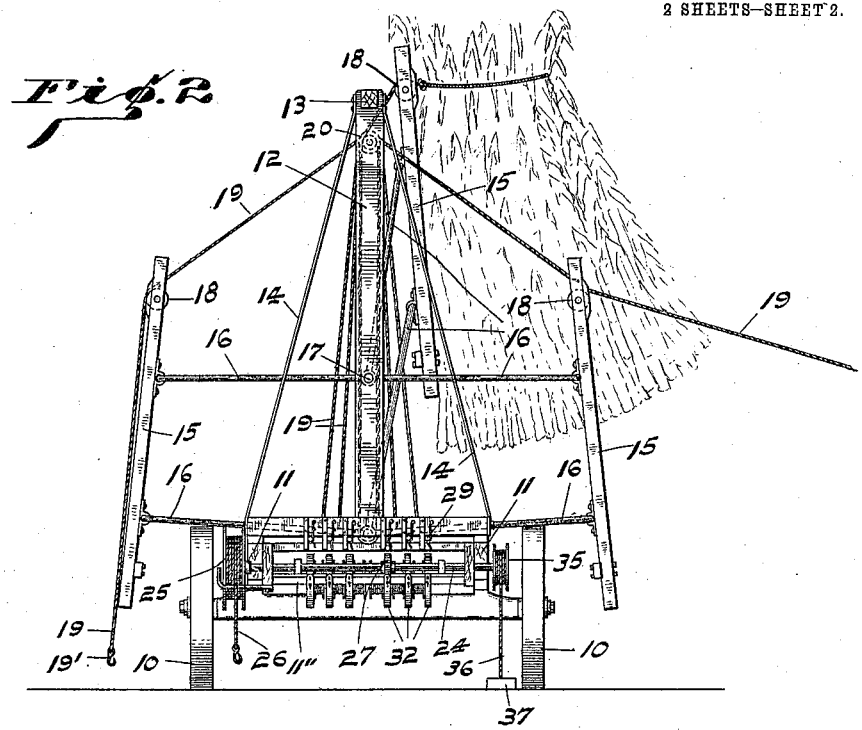
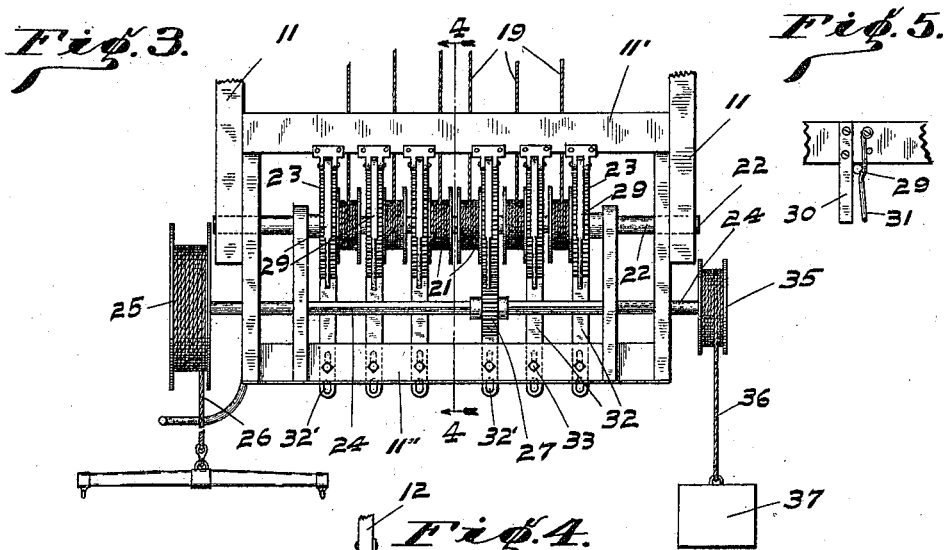
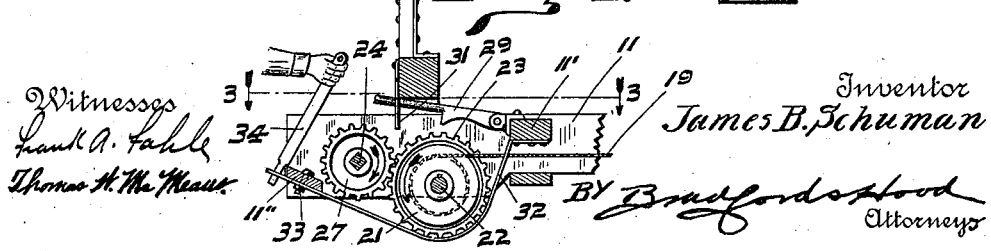

UNITED STATES PATENT OFFICE.

JAMES B. SCHUMAN, OF INDIANAPOLIS, INDIANA, ASSIGNOR TO THE SCHUMAN COMPANY, OF INDIANAPOLIS, INDIANA, A CORPORATION OF MAINE.

SHOCK LOADER AND UNLOADER.

983,774.

Specification of Letters Patent.

Patented Feb. 7, 1911.

Application filed April 9, 1907. Serial No. 367,233.

*To all whom it may concern:*

Be it known that I, JAMES B. SCHUMAN, a citizen of the United States, residing at Indianapolis, in the county of Marion and State of Indiana, have invented certain new and useful Improvements in Shock Loaders and Unloaders, of which the following is a specification.

The object of my present invention is to provide an apparatus by means of which material may be rapidly and easily loaded on to a suitable frame structure, there held for such period as may be desired, and then as rapidly and easily unloaded.

It is especially applicable to the work of loading and unloading corn shocks.

It is also adapted to the handling of other material, especially shocks or bundles of any stalk crop.

Said invention therefore consists in an apparatus for the purpose embodying a suitable supporting structure having material-sustaining members mounted thereon and suitable means for attaching material thereto and for manipulating the members, as will be hereinafter more fully described.

The apparatus as a whole is preferably mounted on wheels, as shown, thus becoming in itself a convenient vehicle for transporting the load, although it may of course be constructed separately from the vehicle, if desired.

As already indicated, the principal use to which, as I conceive, my present invention is most advantageously applicable, is the handling of ordinary shocks of corn in the field. As is well known to those familiar with such matters the handling of corn shocks by ordinary methods is very laborious. By my present invention, now to be described, I am able to lift such shocks bodily from the place where made, secure them in unimpaired condition upon the frame structure of my apparatus, transport them to any desired position, and then re-deposit them (on the ground or elsewhere) in their original upright position, and with practically no manual labor, so that convenient access may be had thereto for purposes of husking by hand, or speedy delivery to a corn husking and shredding machine may be had for purposes of husking and shredding by machine. In this way the corn may be assembled when the ground and weather are in suitable condition for the work of transportation, and the delays in operating the husking and shredding machine incident to unfavorable conditions of ground and weather avoided.

When it is remembered that if a corn shock is once disrupted, not only is a considerable portion of the leaves and smaller pieces of the stalks scattered and lost, thus wasting a great deal of the best of the fodder material, but that it is practically impossible to restore it to such a condition as will keep it well preserved when exposed to the weather, the importance of an invention by which it can be handled in its original condition becomes apparent.

In the accompanying drawings Figure 1 is a side elevation of an apparatus embodying my invention; Fig. 2 an end elevation; Fig. 3 a plan of the hoisting mechanism on line 3—3 of Fig. 4; Fig. 4 a section on line 4—4 of Fig. 3; Fig. 5 a detail of means for holding the retaining pawls in inoperative position; Fig. 6 a detail view illustrating an alternative means for automatically rewinding the lifting cables, and Figs. 7 and 8 detail views illustrating an alternative form of the pulley-housings.

In the drawings 10 indicates suitable carrying wheels and 11 connecting sills of a vehicle of any desired type. Erected centrally upon the vehicle is a frame comprising uprights 12 and a connecting upper longitudinal beam 13 suitably braced by members 14. Mounted upon the structure thus formed are any desired number (six being shown) of suitable independent shock-carrying members 15. Each of the shock carrying members 15 is pivotally supported on the outer ends of a pair of swinging links 16, 16 which, at their inner ends, are pivotally connected to the frame work, a convenient pivotal support consisting of longitudinal (preferably tubular) rods 17, 17, supported in the vertical frame members 12. The shock supporting members 15 are preferably arranged in opposite pairs so as to balance each other on the superstructure, and each is provided near its upper end with a guide pulley 18 over which a lifting cable 19 is carried to a pulley 20 supported by the beam 13 and passes from thence over a suitable guide pulley 20' to a winding drum 21 journaled upon a rod 22 carried at the rear end of the sills 11, there being a separate drum 21 for each cable 19. Each drum 21 is freely rotatable upon rod 22, and is provided with a gear 23 by means of which it may be rotated. Journaled in the frame adjacent rod 22, and parallel therewith, is a shaft 24 provided at one end with a drum 25 which carries a power cable 26 adapted to be hitched to any power device, conveniently a horse. Shaft 24 has a pinion 27 mounted thereon in such fashion as to slide freely lengthwise, while having no independent capacity of rotation; and which, by sliding on the shaft, may be brought into mesh with any one of gears 23,—the arrangement being such that, when cable 26 is pulled, shaft 24 will be rotated and that gear 23, with which pinion 27 is in mesh, will be rotated so as to wind up the corresponding cable 19 on the corresponding drum 21. In order to retain drums 21 independently in any desired position, I provide, adjacent each gear 23, a retaining pawl 29. Each of these pawls 29 is provided with an extended end which lies between a stationary finger 30 and a spring finger 31 which is adapted to retain the pawl 29 in its upper, or inoperative, position, as clearly shown in Figs. 4 and 5. Secured to a cross bar 11′, is a series of metal strap brakes 32, each of which is extended downwardly and rearwardly beneath a gear 23 so as to engage the ends of the teeth thereof, and at its rear end is connected to a cross member 11″ by means of a bolt 33 passing through slot 32′ formed in the strap. Slot 32′ extends beyond the rear edge of the member 11″ in order to receive the end of a lever 34, which, after being inserted, may be canted over the rear edge of the cross bar 11″ so as to draw the strap 32 against the adjacent gear 23, and thus serve as a brake for said gear.

In order to automatically rewind the cable 26 upon drum 25, I mount, upon shaft 24, a drum 35, provided with a cable 36. Cable 36 is wound on drum 35 in a direction opposite to the direction of winding of cable 26 on drum 25, and secured to the end of cable 36 is a weight 37, which rests or drags upon the ground. In Fig. 6 I have shown an alternative means for automatically rewinding the cable, in which a spring 39 on the frame serves in place of the dragging weight.

The outer end of each cable 19 is provided with a hook 19′ or other suitable device, by means of which the cable may be passed around the waist of the shock, as shown in Fig. 2.

The operation is as follows: The apparatus is drawn to the neighborhood of a shock and the shock-carrying member 15, directly opposite the shock, let down to its lowest position. The cable 19 is then carried outward and passed around the waist of the shock. Pinion 27 is then brought into mesh with that gear 23 which is carried by the drum 21 of the particular cable 19 being used and, by pulling upon cable 26, said drum 21 is rotated and the cable 19 wound thereon so as to first pull the shock sidewise over the ground into engagement with the corresponding carrier 15 and thereafter swing said carrier upward as shown in Fig. 2, so as to lift the shock from the ground and bring it as close as possible to the medial line of the vehicle. The lifted shock is held in this position by the corresponding pawl 29.

When the cable 26 has been drawn out the cable 36 has been wound upon drum 35 so that, when the shock has been lifted, the pinion 27 is thrown to a position out of mesh with any of the gears 23 and when the vehicle is moved into the neighborhood of another shock, the weight 37, resting upon the ground, causes a rotation of shaft 24 in a reverse direction and thus winds cable 26 back upon drum 25.

The loading operation just described is repeated, until a load is secured. Weight 37 is then thrown upon the vehicle and the vehicle with its load is then driven to any desired point. The operator then inserts lever 34 in slot 32′ of one of the brake straps 32 and throws the corresponding retaining pawl 29 out of operative position. Thereupon the shock controlled by this particular drum drops to the ground, being projected outward beyond the side of the vehicle as the shock-receiving member moves downward and outward at the ends of its links 16. The force of the drop may be very readily controlled by means of the lever 34 and brake strap 32, so that the shocks may be stopped at any point, or delivered upon the ground with just sufficient force to firmly set them in position. If it is desired to pack the shocks closely together, one side of the vehicle is unloaded first, and the vehicle is then turned so that the shocks from the other side may be deposited close against the shocks which were first deposited. By the use of my improved apparatus, therefore, I am able to transplace the shocks bodily from the field to the objective point without shattering or appreciably disturbing the position of the stalks, which insures a comparatively clean field and practically a total saving of the crop. A shock being thus deposited, intact and undisturbed, assumes substantially its original field position, and is capable of withstanding the elements and remaining exposed indefinitely without damage. This is of much importance, for the reason that the time within which the corn may be shredded is very short, and by this means a crop (or portions thereof) may be removed from the field in propitious weather in advance of the arrival of the shredding machinery, and left exposed without danger of additional damage from inclement weather, as well as during the operation of such machinery from day to day.

It will be noted that by the use of my apparatus I am able to load the corn shocks as shock units; to maintain them in their condition as shock units while being transported; to unload or deposit them and cause them to maintain their relative upright positions as shock units at the objective point; and all this without shattering the shocks or appreciably disturbing their arrangement, or wasting the material, or impairing their weather-resisting characteristics, and with scarcely any manual labor and with great rapidity.

In Fig. 6 I have shown, as an alternative construction, (instead of the weight 37) as a means for automatically rewinding the lifting cables, a spring 47 mounted on a fixed shaft 48 and attached to and operating a winding drum 46, around which the rewinding cable 36 running from drum 35 may pass. In this construction I have, as a matter of convenience, transferred the drum 35 to the end of the shaft which carries drum 25. On the drum 25 I have also shown a crank-handle 25' by means of which said drum can be wound up by hand. I have shown in Figs. 7 and 8 (and also in the upper right-hand portion of Fig. 1) certain modified forms of sheave-housings. The pulleys 20, over which ropes 19 pass, are shown at the right-hand end of Fig. 1, and also in Fig. 7, as mounted in housings 20″ on top of instead of below the beam 13. These housings are also shown of a rather different, and in some respects (as I believe) better construction. Two of these housings are secured to the beam close alongside of each other; and they may be formed in a single structure, or separately, as may be desired. The guide pulley 18 at the upper end of the carrying member 15 is also shown as mounted upon the upper end of said part 15 instead of on its side. It is contained, in this alternative form, within a housing 18′, which, as best shown in Fig. 8, has protecting and guiding flanges f at that side where the lifting cable 19 enters. This form efficiently guides the cable to the sheave or pulley 18, when, as is sometimes the case, the shock being drawn up to the shock-carrying member is somewhat out of line with the pulleys 18 and 20.

Having thus fully described my said invention, what I claim as new, and desire to secure by Letters Patent, is:—

1. The combination, with a portable supporting structure, of a plurality of swinging shock-sustaining members, each having a pivotal support on the structure substantially in the longitudinal middle thereof and the several members arranged to be projected from opposite sides of the vehicle by a downward movement, and a series of winding drums and lifting cables, one for each shock-sustaining member.

2. The combination, with a portable supporting structure, of a plurality of swinging shock-sustaining members mounted thereon, a series of winding drums and lifting cables one for each shock-sustaining member, a gear for each drum, a power shaft, a pinion carried by said power shaft and adapted to be shifted into engagement with any one of said gears, a power drum and cable for said power shaft, and means for rewinding said cable on said drum.

3. The combination, with a portable supporting structure, of a plurality of swinging shock-sustaining members mounted thereon, a series of winding drums and lifting cables one for each shock-sustaining member, a gear for each drum, a power shaft, a pinion carried by said power shaft and adapted to be shifted into engagement with any one of said gears, a power drum and cable for said power shaft, and an automatically-acting means for rewinding said cable on said drum.

4. The combination, in a loading and unloading apparatus, of a load receiving member, a power drum and cable, a rewinding drum for said power-drum, a rewinding cable carried by said rewinding drum, and automatically acting means connected to and adapted to operate said rewinding cable.

5. The combination, with a portable supporting structure, of a plurality of shock-sustaining members mounted thereon, means for attaching a shock to each member, means for elevating the shock, and means for returning the elevating means to its operative position.

6. The combination, with a portable supporting structure, of means mounted on said structure for engaging and lifting a shock in a substantially vertical position and supporting and guiding the same in such position to a point over the structure and substantially within the base thereof, and for correspondingly guiding such shock beyond the base of the structure and lowering the same as a unit.

7. The combination, with a portable supporting structure, of a plurality of shock-sustaining members supported substantially centrally on said structure and projecting on each side thereof and arranged in line and opposite each other, means for attaching a shock to each of said shock-sustaining members and for elevating and sustaining said shocks substantially vertically in proximity to each other.

8. A lifting device comprising a sustaining bar mounted on a suitable supporting structure, adjustable flexible means associated with said bar and adapted to encircle the load, and means for drawing said encircling means with its load to said bar and swinging said bar bodily upwardly or downwardly in a substantially vertical position.

9. A lifting device comprising a supporting structure, a sustaining member mounted thereon, extensible means associated with said member and adapted to encircle and grip a load distant therefrom, and means for drawing said gripping means to said member and bodily elevating and lowering said member in a substantially vertical position.

10. In a shock loading and unloading device, the combination with a supporting structure, of a shock-lifter mounted on said structure to move bodily in a substantially vertical position upwardly when lifting a shock and downwardly when depositing the same, an operating cable connected to one end of said shock-lifter and extending to said supporting structure, and means for operating said cable to elevate and lower said shock-lifter.

11. The combination, with a vehicle, of a plurality of shock-receiving members independently movable transversely and vertically on said vehicle, means for attaching a shock to each of said members, and means for holding said members in elevated position.

12. The combination, with a vehicle, of a plurality of shock-receiving members independently movable transversely and upwardly on said vehicle, means for attaching a shock to each of said members, and means for holding said members in elevated position.

13. The combination, with a vehicle, of a plurality of shock-receiving members independently movable bodily transversely and vertically on said vehicle, means for attaching a shock to each of said members, a winding drum for each shock-receiving member, a cable from each drum to a shock-receiving member, and means for holding the drums against unwinding.

14. The combination, with a vehicle, of a plurality of shock-receiving members independently movable transversely and upwardly on said vehicle, means for attaching a shock to each of said members, a winding drum for each shock-receiving member, a cable from each drum to a shock-receiving member, and means for holding the drums against unwinding.

15. The combination, with a vehicle, of a plurality of movable shock-receiving members thereon, a series of winding drums and lifting cables, one for each of said members, a gear carried by each of said drums, a power shaft, a pinion longitudinally but not revolubly mounted on said shaft and adapted to be meshed with any one of said gears, and a power drum and cable for operating said power shaft.

16. The combination, with a vehicle, of a plurality of movable shock-receiving members thereon, a series of winding drums and lifting cables, one for each of said members, a gear carried by each of said drums, a power shaft, a pinion longitudinally but not revolubly mounted on said shaft and adapted to be meshed with any one of said gears, a power drum and cable for operating said power shaft, a rewinding drum and cable for said power-drum, and a weight attached to said rewinding-cable, for the purpose set forth.

17. The combination with a vehicle, of a load receiving member, a power-drum and cable mounted on said vehicle, a rewinding-drum for said power-drum, a rewinding cable carried by said rewinding drum, and a weight attached to said rewinding cable and adapted to rest upon the ground, for the purpose set forth.

18. The combination, with a vehicle, of a load receiving member, a power-drum and cable mounted on said vehicle, a rewinding-drum for said power-drum, a rewinding cable carried by said rewinding-drum, and automatically-acting means attached to and adapted to operate said rewinding cable.

19. The combination, with a vehicle, of a plurality of shock-receiving members independently bodily movable transversely on said vehicle, and a series of winding drums and lifting cables, one for each shock-receiving member.

20. The combination, with a vehicle, of a plurality of shock-receiving members independently bodily movable transversely and vertically, and a series of winding drums and lifting cables, one for each shock-receiving member.

21. The combination, with a vehicle, of a plurality of shock-receiving members independently movable transversely on said vehicle, a series of winding drums and lifting cables, one for each shock-receiving member, a gear for each drum, a power shaft, a pinion carried by said power shaft and adapted to be meshed with any one of said gears, a power-drum and cable for said power-shaft, a rewinding drum and cable for said power drum, and a weight attached to said rewinding cable and adapted to rest on the ground, for the purpose set forth.

22. The combination, with a vehicle, of a plurality of shock-receiving members independently movable vertically, a series of winding drums and lifting cables, one for each shock-receiving member, a gear for each drum, a power shaft, a pinion carried by said power shaft and adapted to be meshed with any one of said gears, a power-drum and cable for said power-shaft, a rewinding drum and cable for said power drum, and a weight attached to said rewinding cable and adapted to rest on the ground, for the purpose set forth.

23. The combination, with a vehicle, of a plurality of shock-receiving members independently movable transversely and vertically, a series of winding drums and lifting cables, one for each shock-receiving member, a gear for each drum, a power shaft, a pinion carried by said power shaft and adapted to be meshed with any one of said gears, a power-drum and cable for said power-shaft, a rewinding drum and cable for said power drum, and a weight attached to said rewinding cable and adapted to rest on the ground for the purpose set forth.

24. The combination, with a vehicle, of a plurality of shock-receiving members each carried by a pair of swinging links, a series of winding drums and lifting cables, one for each shock-receiving member, a gear for each drum, a power shaft, a pinion carried by said power-shaft and adapted to be meshed with any one of said gears, a power-drum and cable for said power-shaft, a rewinding drum and cable for said power drum, and a weight attached to said rewinding cable and adapted to rest on the ground, for the purpose set forth.

25. The combination with a vehicle, of two opposed series of shock-receiving members each carried by a pair of swinging links the inner ends whereof are pivotally supported substantially medially of the vehicle, and means for shifting said members on the vehicle.

26. The combination, with a portable supporting structure, of two series of upwardly and transversely movable shock-sustaining members mounted upon opposite sides of the longitudinal middle of said structure, means for attaching shocks to said members, and means for raising said members and at the same time shifting the same transversely toward the longitudinal middle of the vehicle.

27. The combination, with a vehicle, of a plurality of shock-receiving members independently movable transversely and substantially vertical on said vehicle, a series of winding drums and lifting cables, one for each shock-receiving member, a gear for each drum, a power shaft, a pinion carried by said power shaft and adapted to be meshed with any one of said gears, and means for operating said power shaft for the purpose set forth.

28. The combination, with a vehicle, of a plurality of shock-receiving members independently movable transversely and substantially vertical on said vehicle, a series of winding drums and lifting cables, one for each shock-receiving member, a gear for each drum, a power shaft, a pinion carried by said power shaft and adapted to be meshed with any one of said gears, means for operating said power shaft, and means for rewinding said power shaft, for the purpose set forth.

29. The combination, with a vehicle, of two series of shock-lifting members mounted thereon upon opposite sides of the longitudinal middle and each movable upwardly and inwardly, an elevated bar extending medially longitudinally of the vehicle, and a plurality of lifting means carried by said bar, one for each shock-lifting member, for raising and lowering said shock-lifting members.

30. The combination, with a vehicle, of two series of shock-lifting members mounted thereon upon opposite sides of the longitudinal middle and each movable upwardly and inwardly in a substantially upright position, an elevated bar extending medially longitudinally of the vehicle, and a plurality of lifting means carried by said bar, one for each shock-lifting member, for raising and lowering said shock-lifting members.

31. The combination, with a vehicle, of two series of opposed substantially vertical shock-receiving members, arranged upon opposite sides of the longitudinal middle of the vehicle and each supported upon the outer ends of a pair of links hinged to the vehicle, an elevated support arranged medially on the vehicle, and a plurality of lifting-cables carried by said support and each engaging one of the shock-receiving members to raise and lower the same.

32. The combination, with a vehicle, of an elevated longitudinal supporting structure arranged medially thereof, a plurality of shock-lifting members arranged upon opposite sides of said support, and means depending from said support above each of said shock-receiving members for attaching and lifting a shock.

33. The combination, with a vehicle, of an elevated longitudinal support mounted medially thereon, two sets of movable shock-lifting members mounted on opposite sides of the vehicle, a guideway in the upper end of each of said shock-lifting members, a plurality of cables depending from the elevated support and each associated with the guideway of a lifting member, and means for actuating said members to lift and lower the lifting members.

34. The combination, with a vehicle, of an elevated longitudinal supporting structure mounted medially on said vehicle, shock-lifting members mounted on said vehicle upon opposite sides of said elevated support and movable upwardly and inwardly toward said elevated support, and means for shifting said shock-lifting members upwardly toward and downwardly away from said elevated support.

35. The combination, with a vehicle, of an elevated support mounted medially thereon, a series of shock-receiving members, mounted on said vehicle and movable upwardly toward and outwardly from said elevated support, operating cables mounted on said elevated support, one for each shock-receiving member and connected thereto, and means for actuating said cables to raise and lower said shock-receiving members.

36. A shock loader and unloader comprising a vehicle body, a frame mounted thereon and consisting of uprights and a longitudinal connecting beam, shock lifters mounted upon said frame, and means carried by said frame for lifting and lowering said shock lifters.

37. A shock loader and unloader comprising a vehicle body, a shock-sustaining elevated support mounted thereon, a plurality of shock-receiving members mounted on said support, a cable-carrying member at the upper end of said support, cables carried thereby and dependent therefrom and each connected with a shock-receiving member, and means for actuating said cables to raise and lower the shock-receiving members.

38. A shock loader and unloader comprising a vehicle body, a supporting structure mounted on said body, shock lifters mounted on said structure and movable outwardly therefrom beyond the sides of the vehicle and upwardly toward said support and over the vehicle body, and means for shifting said shock lifters.

39. The combination, with a vehicle, of a lifting device comprising a sustaining bar and pair of links pivotally connected at their outer ends to said bar and at their inner ends to the vehicle body.

40. The combination, with a vehicle, of a lifting device comprising a sustaining bar, means connecting said sustaining bar with the vehicle and permitting movement of said bar upwardly and inwardly or downwardly and outwardly in an approximately vertical position, and means for shifting said bar as described.

41. In a shock loader and unloader, the combination of a supporting vehicle, a plurality of shock-lifting means positioned on opposite sides thereof, and a plurality of means each communicating with one of said shock-lifting means for raising and lowering the same and sustaining the same in elevated position with the shock in a substantially upright position.

42. A shock loader and unloader comprising a vehicle an elevated frame mounted thereon, shock lifting members movably mounted on said vehicle, means supported by said elevated frame for elevating and lowering said members, means for holding said members in elevated position, and means for controlling the speed of said members in their descent.

43. The combination, with a vehicle, of a plurality of members mounted on said vehicle and each adapted to receive a shock in substantially upright position, and means for shifting said members from a position transversely extended beyond the sides of the vehicle to a position bringing the weight of the shocks carried thereby substantially within the base of the vehicle with such shocks substantially upright.

44. The combination, with a vehicle, of a plurality of members mounted on said vehicle and each adapted to receive a shock in substantially upright position, and means for independently shifting said members from a position transversely extended beyond the sides of the vehicle to a position bringing the weight of the shocks carried thereby substantially within the base of the vehicle with such shocks substantially upright.

45. The combination, with a vehicle, of a plurality of members mounted on said vehicle and each adapted to receive a shock in substantially upright position, and means for bodily shifting said members from a position transversely extended beyond the sides of the vehicle to a position bringing the weight of the shocks carried thereby substantially within the base of the vehicle with such shocks substantially upright, without a relative swinging movement between the shock and its supporting member.

46. The combination, with a vehicle, of a plurality of members mounted on said vehicle and each adapted to receive a shock in substantially upright position, and means for independently bodily shifting said members from a position transversely extended beyond the sides of the vehicle to a position bringing the weight of the shocks carried thereby substantially within the base of the vehicle with such shocks subsantially upright, without a relative swinging movement between the shock and its supporting member.

47. The combination, with a vehicle, of a movable load-receiving member on said vehicle, a winding drum, a cable between said drum and load-receiving member, a power drum, intermediate connections between said power drum and the load-receiving member for shifting the same, a power cable wound upon said drum, and means for automatically rewinding said power cable on its drum.

48. The combination, with a vehicle, of a plurality of shock-receiving members independently movable transversely on said vehicle, a series of winding drums and lifting cables, one for each shock-receiving member, a gear for each drum, a power shaft, a pinion carried by said power shaft and adapted to be meshed with any one of said gears, and a power drum and cable for said power shaft.

49. A shock loader and unloader comprising a vehicle, a support substantially centrally mounted on said vehicle, shock-lifting devices movably mounted on said support and divergent therefrom when in shock-receiving position and in close proximity thereto when in elevated shock-sustaining position, and means for shifting said lifting devices to such positions.

50. A shock loader and unloader comprising a vehicle, a support mounted upon said vehicle, movable shock lifters mounted upon said support free of the vehicle body and capable of elevation bodily thereover, and means for elevating and lowering said shock lifters.

51. A shock loader and unloader comprising a vehicle, an elevated support mounted on said vehicle, shock-lifting means mounted on said support and extending beyond the vehicle when in shock-receiving position, and means for so positioning said lifters and for drawing them upwardly and inwardly alongside the elevated support.

52. A shock loader and unloader comprising a vehicle, a supporting frame mounted thereon and constituting a bearing for a plurality of shock-lifting members, a plurality of shock-lifting members, a link connecting each of said members to said frame, means associated with said frame for individually operating said members, and means for actuating said operating means.

In witness whereof, I, have hereunto set my hand and seal at Indianapolis, Indiana, this second day of April, A. D. one thousand nine hundred and seven.

JAMES B. SCHUMAN. [L. S.]

Witnesses:
CHESTER BRADFORD,
THOMAS W. MCMEANS.